3,004,712
SNAP-ACTION THERMOSTATIC VALVE
Thomas Edmund Noakes, Detroit, Mich., assignor to American Radiator & Standard Sanitary Corporation, New York, N.Y., a corporation of Delaware
Filed May 20, 1960, Ser. No. 30,477
6 Claims. (Cl. 236—48)

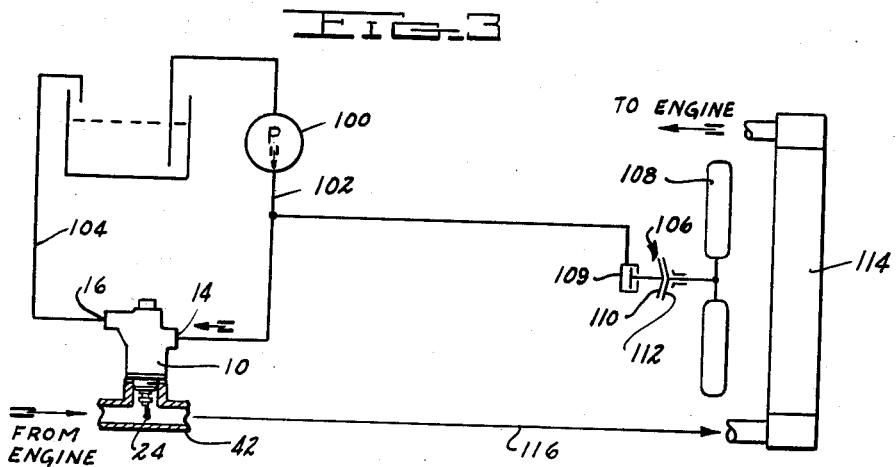
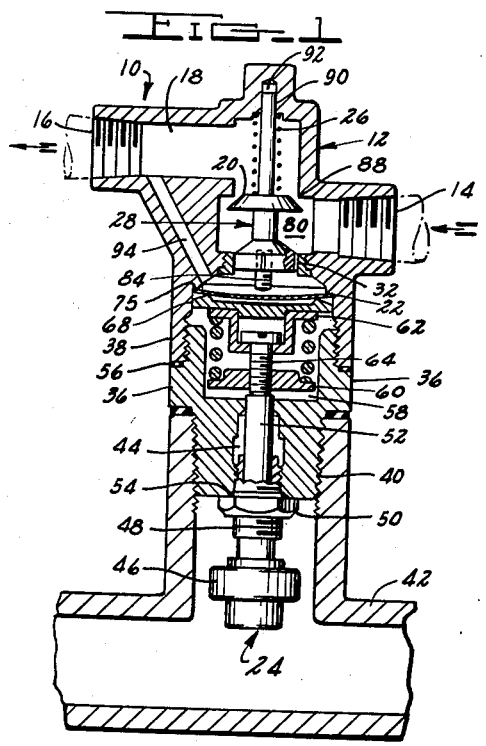
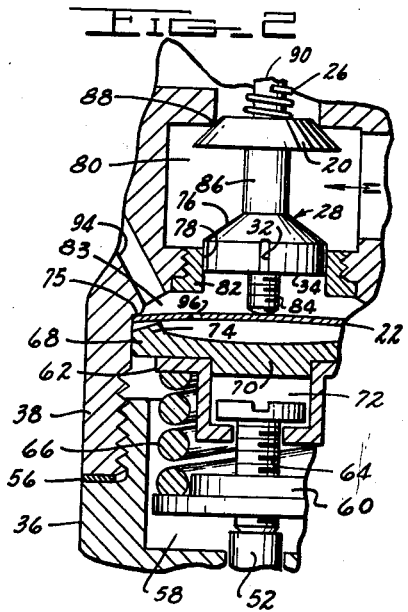
INVENTOR.
Thomas Edmund Noakes
BY
Wilson, Lewis & McRae
ATTORNEYS

# United States Patent Office 3,004,712
Patented Oct. 17, 1961

This invention relates to a snap-action thermostatic valve, and more particularly to a thermostatic valve useful to control the flow of oil to a fan clutch of a cooling system in response to temperature change of fluid being air cooled.

The invention has application in many installations. However, as above mentioned it may be utilized in vehicles to control flow of oil to the clutch of the air fan. The arrangement is such that the clutch is engaged and disengaged according to coolant temperature in order to provide power economy and to assist in maintaining the proper coolant temperature. The ultimate aim is to enable the vehicle engine to utilize its power output to the best advantage and with improved economy of operation.

The operation of the fan clutch is improved if the valve which controls the oil flow thereto is opened and closed with a snap-action to provide instantaneous engagement and disengagement of the clutch. The oil operating the clutch is under relatively high pressure. Considerable operating force is required to open and close valve elements in the oil line. Provision of this operating force necessitates the use of a high-strength thermostatic power element as the controller for the valve element. Thermostatic power elements of the so-called "solid fill" type have been developed for providing such large operating forces. However, these power elements are inherently of modulating operation such that it is impractical to obtain a snap-action by means of a direct connection between such power elements and a valve element.

It is an object of the present invention to provide a snap-action thermostatic valve wherein the valve element thereof is moved with a snap-action and wherein the controlling force for the valve element is of a relatively high-strength character to adapt the valve to installations having high fluid pressures.

Another object of the invention is to provide such a thermostatic valve which has a restricted bypass passage between the inlet and outlet to provide for constant fluid flow therethrough in order to keep the fluid pump at a low operating temperature.

A further object is to provide such a bypass which will create a balanced condition for the valve element so that operation of the valve will not be affected by the pressure of the fluid input.

A further object of the invention is to provide a snap-action valve structure which may utilize as the motive force a high-strength, modulating response thermostatic power element.

Another object of the invention is to provide a snap-action valve structure of relatively simple, low cost construction.

Other objects of this invention will appear in the following description and appended claims, reference being had to the accompanying drawings forming a part of this specification wherein like reference characters designate corresponding parts in the several views.

In the drawings:
FIG. 1 is a sectional side elevational view of one embodiment of the snap-action thermostatic valve of the present invention;
FIG. 2 is an enlarged view in section of the valve operating mechanism of the FIG. 1 embodiment; and
FIG. 3 is a view of the valve of FIG. 1 diagrammatically illustrating its use in a fluid cooling system.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown in FIG. 1, the snap-action thermostatic valve 10 comprises a casing 12 having inlet means 14 and outlet means 16. A main passage 18 is provided for fluid flow through the casing from the inlet means to the outlet means. A valve element 20 is provided for controlling flow in the main passage 18. Snap-action means, including a conventional snap-disc 22, are provided to control movement of the valve element 20 in both directions. Thermostatic means, shown as a power element 24, are provided in operative relationship to the snap-action means. The thermostatic means is subject to reciprocatory movement in responses to changes of temperature. Upon reciprocation, the thermostatic means is operative to reciprocate in a first direction to actuate the snap-action means to suddenly move the valve element in one direction (in the embodiment shown, to the closed position). Biasing means, shown as a spring 26, constantly urge the valve element in the opposite, or open, position. The biasing means are operative upon reciprocation of the thermostatic means in a second reverse direction to suddenly move the valve element in the biased direction. Thrust means 28 are positioned upstream of the valve element for transmitting movement of the snap-action to the valve element. A bypass flow path is provided for constant fluid flow through the casing from the inlet means to the downstream side of the thrust means and thence to the outlet means. A restriction 32 is provided in the bypass between the inlet means 14 and the downstream side 34 of the thrust means.

Referring to the figures in more detail, it may be seen that the casing 12 comprises two threadingly engageable sections 36, 38. The section 36 is provided with a threaded portion 40 for engagement with a conduit fitting 42. The conduit 42 is in the direct line of the cooling fluid. The power element 24 is threadingly engaged in a bore 44 extending centrally through the section 36. The illustrated power element 24 comprises a casing structure 46 containing a temperature responsive material. Extending from the casing 46 is a threaded extension 48 for engagement with the bore 44. The power element is locked in a properly calibrated position of adjustment by means of the lock nut 50.

The thermostatic power element illustrated includes a pellet in the casing 46 of solid thermally expansible material such as wax, dibromobenzine, or other similar solid expansion materials which, upon temperature change, are transformed from a solid state to a liquid state with accompanying volumetric increase and corresponding development of pressure. The pellet may suitably have disposed therethrough finely divided particles of aluminum, copper, or other materials for the purpose of promoting rapid pellet volume change in response to ambient temperature change. The pressure created by expansion of the pellet drives a plunger 52, slidably mounted in the extension 48. Upon a decrease in temperature, the pellet decreases in volume and the plunger may be pushed back into the extension 48. Suitable power element structure is shown in U.S. Patent 2, 636, 776. It is to be appreciated that while a particular thermostatic device has been illustrated, other thermostatic devices could be used within the scope of the invention.

The power element is sealed at its point of connection with the casing section 36 by means of an O-ring 54. The casing sections 36, 38 are sealed at their point of connection by a gasket 56. This results in making the entire hollow interior of the casing fluid tight.

The inner end of the power element plunger 52 abuts against the end of a screw 64 forming part of a harness slidably mounted in recess 58. The harness comprises two end plates 60, 62 secured together by the screw 64 which extends through an opening in plate 62 and threadingly engages plate 60. A coil spring 66 is contained between the end plates. The spring 66 is pre-loaded by tightening of the screw 64. The purpose of pre-loading spring 66 is so that in operation the harness will act as a rigid element until the force exerted by the plunger 52 equals the pre-load placed on the spring 66. At this point, the spring 66 will begin to collapse. As will be appreciated, screw 64 will slide in end plate 62 to permit collapsing of the spring after motion of plate 62 has been stopped. Such collapsing is desirable after the valve element 20 has been closed, in order to permit over-travel of the plunger 52. Such over-travel is desirable to permit the plunger 52 to continue movement in order to relieve the pressure created by the expanding pellets of the power element. Such additional expanding may be encountered in instances where the temperature of the cooling fluid continues to rise after the operating temperature of the valve has been reached. If the plunger 52 were not permitted to continue movement, the expanding pellets would deform the casing 46 of the power element and damage the power element.

The end plate 62 abuts against a slidable pusher member 68 and is positioned with respect thereto by a projection 70 on the pusher plate which is inserted into the recess 72 formed in the end plate 62. The pusher plate has an annular knife-edged projection 74 which engages the dish-shaped snap-disc 22. The disc rests against an annular shoulder 75 formed in the casing. The disc is fabricated from a resilient, flexible metallic material. In FIG. 1, the pusher member 68 is shown in the valve-open position in which the disc 22 is in the normal or unstressed shape. In FIG. 2, the pusher member is shown in valve-closed position in which the disc 22 is snapped to the corresponding position.

Positioned adjacent the disc 22 is the valve element thrust means 28. The thrust means comprises a plug 76 which is slidingly received in opening 78. The opening 78, as may be seen, leads into a chamber 80 forming part of the passage 18. A guide bushing 82 may be detachably provided in the opening 78 to provide a low friction contact with the plug 76.

An adjustable screw 84 is carried in the plug 76. The screw 84 is adjusted so that its outer end is positioned within the snap range of the snap-disc 22 with the valve in the closed positioned as illustrated in FIG. 2. This adjustment is to permit the snap-disc to move to its snap position before the valve opening action begins, as will be explained more fully hereinafter.

The plug 76 is connected to the conical valve element 20 by means of a stem 86. The valve element is adapted to seat against seat 88 to close the main passage 18. A stem 90 is provided on the valve element to receive coil spring 26. The outer end of the stem 90 is slidingly receivable in recess 92 to guide the motion of the valve element.

The previously mentioned bypass passage extends from the inlet 14 through the chamber 80, thence through the restriction 32 provided as a slot in the outer periphery of the plug 76. Fuid passing through the restriction 32 enters the space or chamber 83 between the downstream side of the plug 76 and the disc 22. It then passes through a relatively large duct 94 to the outlet 16.

As previously mentioned, the bypass has two functions: to permit constant fluid flow through the valve 10 and to balance the valve mechanism. The constant flow should, of course, not be as large as the flow through the main passage. For this reason, restriction 32 is provided to drop the pressure and reduce the flow. Balancing is accomplished by providing the same pressure on the downstream side of the valve element 20 as exists on the downstream side of the plug 76. The diameter of the valve seat 88 and the opening 78 are equal, consequently the effective areas and the pressures will be equal. The same condition, of course, also prevails for the upstream side of the valve element and plug. While for many instances, a balanced condition is desirable, it is to be noted that the area of the valve seat relative to the area of the plug opening can be varied to obtain various effects from the resultant pressure differences. Such pressure differences are useful in some applications.

An opening 96 is provided in the disc 22 to the end that fluid will be vented therethrough to create a balanced pressure condition on both sides of the disc. Since the casing 12 is sealed by O-ring 54 and gasket 56, there will be no leakage from the casing.

As previously mentioned, the snap disc 22 is of conventional design. The disc, which is fabricated of spring material, is constructed in a dish shape which is biased to assume the position shown in FIG. 2. The disc may be deformed by external forces to assume the FIG. 1 position, but when these forces are removed it will snap back to the FIG. 2 position. The disc has what is termed a "snap range," which is the distance through which the center portion of the disc will snap when the pressure which has been applied to the peripheral portion thereof causes peripheral deformation sufficient to result in snapping. The point at which the disc will snap is referred to as the "snap point." Before it snaps, the center portion does not move at all. After the disc has snapped, continued application of pressure will cause further unrestrained deformation but will not involve a further snapping action. In the embodiment shown, the screw 84 is adjusted so that the free end thereof is within the snap range. This permits the snap-disc to move to its return snap position before the valve opening action begins. The valve will open suddenly with the return snap of the disc.

In operation, upon a rise in temperature of the power element pellet, the plunger 52 will be extended. Extension of the plunger will drive the pusher plate 68 to deform the snap-disc 22 towards the screw 84. When sufficient peripheral deformation has occurred the disc will suddenly snap, overcoming the resistance of spring 26, and moving the valve element 20 to its closed position. Upon a decrease in power element temperature, the plunger 52 will be movable in the opposite direction, reducing the force on the pusher member 68 until the snap point is reached, at which time the center of the disc will snap back to its initial position. At this time, the spring 26 will suddenly move the valve element 20 to the open position.

Referring to FIG. 3, there is shown a hydraulic system for operating a fan clutch of a vehicle cooling system including an oil reservoir 98 for feeding oil to the pump 100, said pump having an output line 102 for feeding oil to the inlet chamber 14 of the valve 10. The outlet chamber 16 of the valve connects with the discharge line 104 leading back to the oil reservoir. The oil in this system is utilized to operate a clutch 106 for the fan 108, the arrangement being such that when the valve element 10 is in a closed position as illustrated in FIG. 2, the pump pressure is applied to piston 109 to force clutch element 110 towards the element 112 to engage the clutch and thereby permit the vehicle engine to operate the fan 108. When the valve element 10 is moved to an open position as illustrated in FIG. 1, the pump pressure is ineffective to maintain the clutch in the engaged position, and the fan 108 is thereby disconnected from the engine to conserve power and maintain proper coolant temperature.

The fan is, of course, operated only when the engine coolant temperature reaches a predetermined high value, the valve element 10 being opened and closed in response to variations in temperature of the engine coolant flowing through the radiator 114. In the illustrated embodiment, the coolant is sent to the radiator through a line 116 which has a portion thereof communicating with the thermostatic power element 24. The arrangement is such that, as previously explained, as the coolant temperature rises to a relatively high temperature, the power element is caused to close, thereby engaging clutch 106 and permitting operation of fan 108. Conversely, as the coolant temperature drops to a lower value, the power element has its temperature-response portion in a contracted position to permit the valve element 10 to be moved to an open position to disengage the clutch 106.

It will be appreciated that the valve 10 may be utilized in other fluid systems, either gas or liquid. One important characteristic of the valve is that, by virtue of its general rugged construction and in particular the valve element balancing system provided, it may be used with high pressure fluids under varying fluid pressure conditions.

Having thus described my invention, I claim:

1. A snap-action thermostatic valve for liquid comprising a casing having inlet means and outlet means; a main passage for liquid flow through the casing from the inlet means to the outlet means; a valve element for controlling flow through the main passage; snap-action means including a snap disc; thermostatic means subject to reciprocatory movement in response to changes of temperature; said thermostatic means being operative upon reciprocation in a first direction to actuate said snap-action means to suddenly move the valve element in one direction; biasing means constantly urging the valve element in the opposite direction; said biasing means being operative upon reciprocation of the thermostatic means in the second reverse direction to suddenly move the valve element in said biased direction; thrust means positioned upstream of the valve element for transmitting movement of the snap-action means to the valve element; said thrust means including a plug element; said main passage having an opening to slidingly receive the plug element; a bypass passage for constant liquid flow through the casing from the inlet means to the bypass downstream side of the plug element and thence to the outlet means; said snap disc forming a wall portion of the bypass passage; said disc having an opening for the passage of liquid therethrough to permit equalization of liquid pressure on both sides thereof; and a restriction in the bypass between the inlet means and the bypass downstream side of the plug element.

2. A valve as claimed in claim 1 and further characterized in the provision of an adjustable abutment element on the bypass downstream side of the plug element; said abutment element being in operative relationship to said snap disc.

3. A valve as claimed in claim 1 and further characterized in that the restriction is provided in the plug element.

4. A valve as claimed in claim 1 and further characterized in that the effective areas of the valve and plug elements in contact with the fluid are substantially equal whereby to create a balanced condition in which operation of the valve is not affected by pressure differentials of the liquid input.

5. A snap-action thermostatic valve for liquid comprising a casing having inlet means and outlet means; a main passage for liquid flow through the casing from the inlet means to the outlet means; a valve element in the main passage for controlling flow therethrough; resilient means normally biasing the valve element to the open position; thermostatic means having a reciprocatory element subject to movement in response to changes of temperature; snap-action means including a snap disc in operative relationship with said reciprocatory element; thrust means interposed between the snap disc and valve element; said reciprocatory element being operative upon movement in one direction to actuate the snap-action means to suddenly move the thrust element and position the valve element to close; said resilient means being operative upon reverse movement of the reciprocatory element to suddenly move the valve element to open position; said thrust means including a plug element; said main passage having an opening to slidingly receive the plug element; a bypass passage for constant liquid flow through the casing from the inlet means to the bypass downstream side of the plug element and thence to the outlet means; said snap disc forming a wall portion of the bypass passage; said disc having an opening for the passage of liquid therethrough to permit equalization of liquid pressure on both sides thereof; and a restriction in the bypass passage between the inlet means and the bypass downstream side of the plug element.

6. A valve as in claim 5 and further characterized in that over-travel means are interposed between said reciprocatory element and the snap-action means; said over-travel means comprising a compression spring preloaded to a predetermined value; said spring being collapsible by the reciprocatory element when the force exerted thereby exceeds the preload of the spring.

References Cited in the file of this patent

UNITED STATES PATENTS

| | | |
|---|---|---|
| 1,844,321 | Kay | Feb. 9, 1932 |
| 1,934,548 | Kellogg | Nov. 7, 1933 |
| 2,294,702 | Van der Werff | Sept. 1, 1942 |
| 2,532,896 | Dillman | Dec. 5, 1950 |
| 2,702,052 | Grayson | Feb. 5, 1952 |
| 2,806,654 | Daly | Sept. 17, 1957 |

FOREIGN PATENTS

| | | |
|---|---|---|
| 401,850 | France | Sept. 17, 1909 |